Oct. 3, 1939.　　　　　H. TURKEL　　　　　2,174,768
SIDE VIEW REFLECTOR FOR VEHICLES
Filed June 13, 1938　　　2 Sheets-Sheet 1
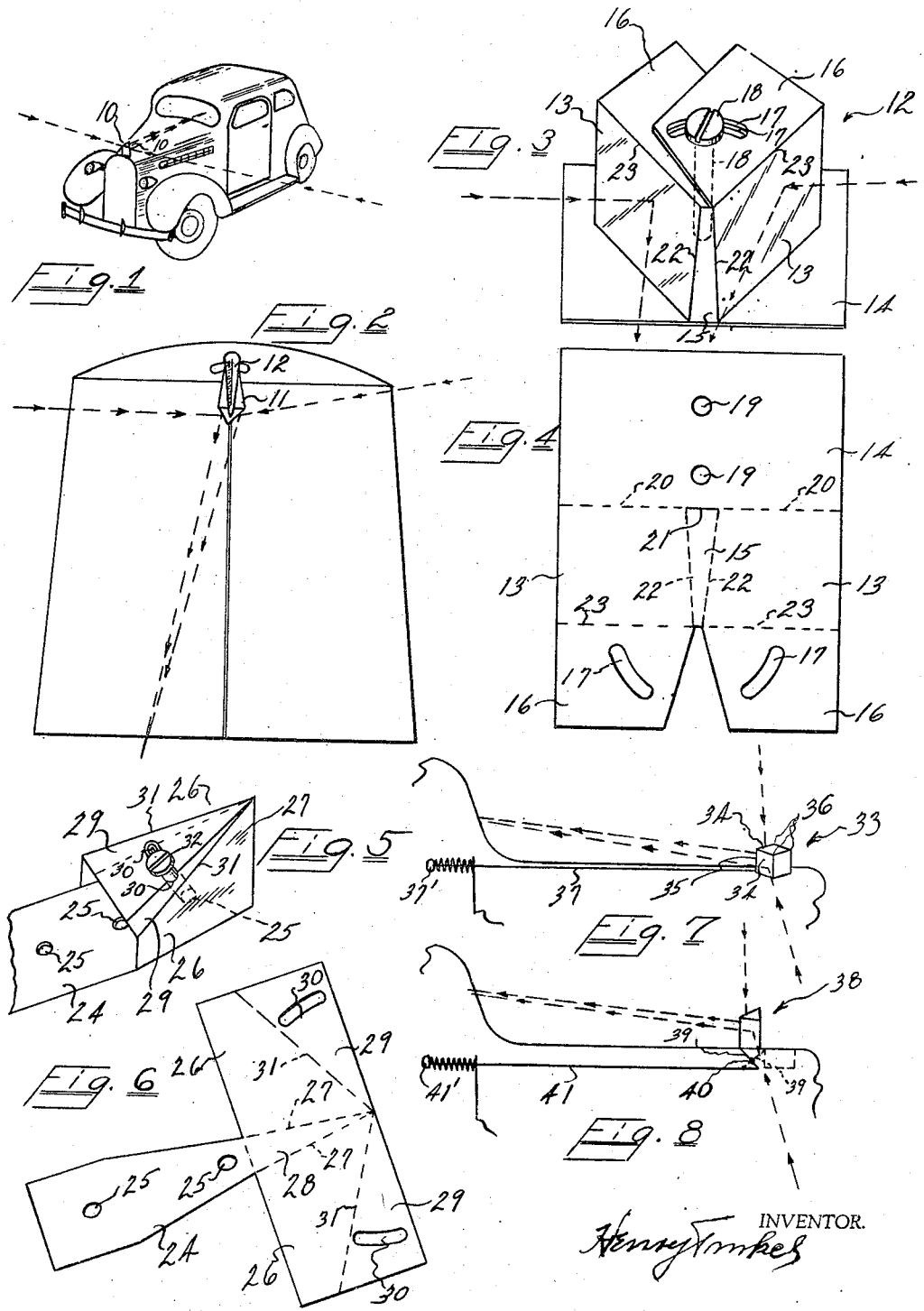
INVENTOR.
Henry Turkel Oct. 3, 1939.  H. TURKEL  2,174,768
SIDE VIEW REFLECTOR FOR VEHICLES
Filed June 13, 1938   2 Sheets-Sheet 2
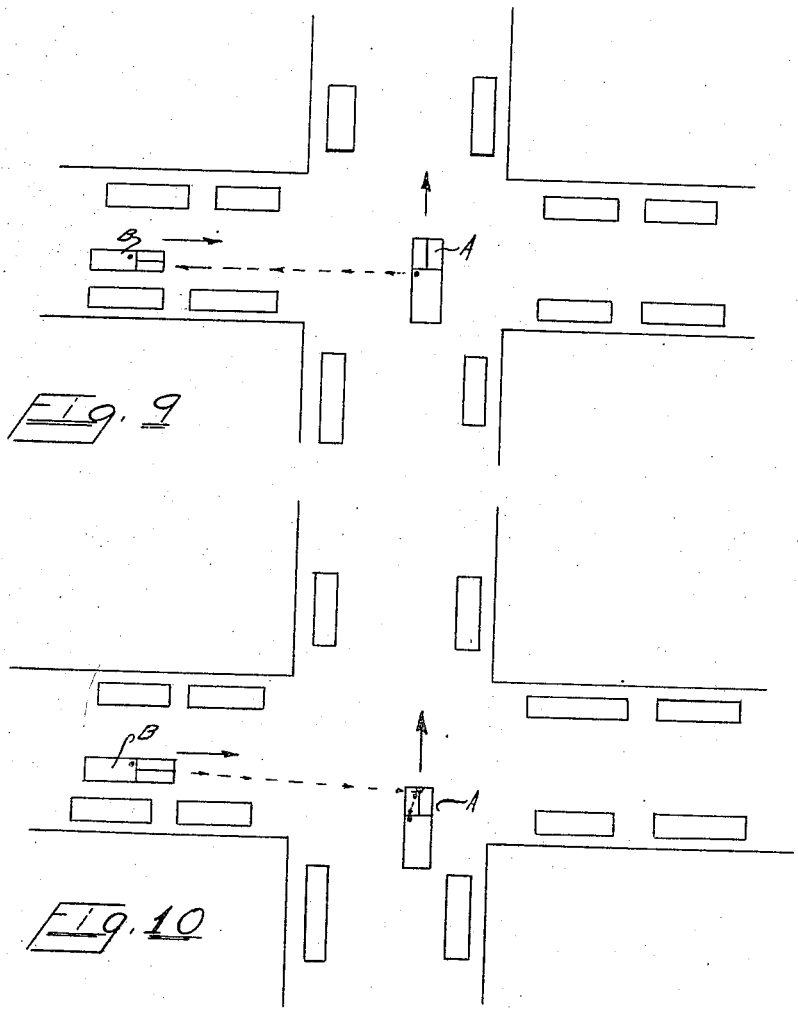
INVENTOR.
Henry Turkel Patented Oct. 3, 1939

2,174,768

UNITED STATES PATENT OFFICE 2,174,768

SIDE VIEW REFLECTOR FOR VEHICLES

Henry Turkel, Detroit, Mich.

Application June 13, 1938, Serial No. 213,482

2 Claims. (Cl. 88—86)

My invention relates to a side view reflector for automobiles and other vehicles designed as a safety device to be attached to the foremost part of the vehicle such as the radiator top, fender, bumper or hood. The purpose of my invention is to minimize the danger which usually exists on entering a busy intersection where cars are parked so close to the corner that a driver finds it difficult to discover the presence of oncoming cars on the intersecting streets specially on the left unless he enters five or more feet into the intersection. My device on the vehicle enables the driver to see the oncoming traffic by entering the intersection only far enough to allow the reflector to operate thus avoiding the danger of being a target for oncoming cars before he can see them.

For better understanding of my invention hereof, reference should be had to the appended drawings of which:

Fig. 1 is a perspective view of an automobile with a reflector on the radiator.

Fig. 2 is a diagrammatic view of an automobile hood with the ornament including a reflector thereon.

Fig. 3 is a perspective view of a simple sideview reflector.

Fig. 4 is a pattern for the reflector shown in Fig. 3.

Fig. 5 is a perspective view of another embodiment of the reflector.

Fig. 6 is a pattern for the reflector shown in Fig. 5.

Fig. 7 is a diagrammatic view of a collapsible reflector operated from the dashboard.

Fig. 8 is a diagrammatic view of another type of collapsible reflector also operated from the dashboard.

Fig. 9 is a diagrammatic view illustrating position of vehicle with no reflector.

Fig. 10 is a diagrammatic view illustrating position of vehicle with reflector.

As shown in Fig. 1, my device consists of reflecting surfaces 10 to be located upon a foremost part of a vehicle for providing the driver with a sideview of the oncoming traffic in an intersection without the driver himself entering the intersection. The reflector may be designed to enable the driver to see in either one or both directions on the intersecting street.

My device may be separate from the ornament on the radiator, fastened to the hood by screws as in Fig. 1, or it may be incorporated in the dog, rabbit, aeroplane or other ornament on the front of the radiator or hood, as in Fig. 2.

In Fig. 2, the reflector 11 is an integral part of the ornament 12 on the hood, adjustable through adjustment of the ornament. The sides of the reflector 13 and 26 respectively as shown in Figs. 3 and 5 are adjustable to the vision of the driver. The adjustment of the reflector depends upon the size of the vehicle and hood or radiator upon which it is used, the individual in the driver's seat and his position therein.

The reflector 12 shown in Fig. 3 consists of vertical sides 13 hingedly mounted to and a part of the base 14 by means of the upright extension 15 which forms a suitable supporting column. The extensions 16 of the reflecting sides 13 are bent across the top of the reflector 12. The disk-like cutouts 17 of the extensions 16 are designed to receive a screw 18 for regulating the adjustment of the reflecting sides 13 with respect to the base 14 and with respect to each other. The screw 18 is secured to the radiator or hood top through a cutout 19 in the base 14 and a hole in the radiator or hood through both of which the screw 18 is passed and bolted. Other cutouts as 17 are provided in the base 14 for securing the extensions 16 of the reflector to the hood or radiator.

In Fig. 4 the pattern for the reflector shown in Fig. 3 consists of a base 14 with cutouts 19 for securing the reflector to the hood or radiator. The pattern cut along the dotted line 20 is bent up on the line 21 which forms segment 15, the supporting column upon which the reflecting surfaces 13 are bent or hinged on the dotted line 22. The top pieces formed by the extensions 16 having the cutouts 17 are bent along the dotted line 23. The screw 18 journaled through the cutouts 17 and the cutouts 19 is bolted underneath the hood or radiator, thus providing a means for securing the reflecting surfaces to the top of the radiator. The reflector is otherwise bolted to the hood through hole 19.

The pattern in Fig. 6 for a different embodiment of the reflector shown in Fig. 5 has a base 24 with cutouts 25 for securing the reflector to the radiator or hood. The reverse side of the reflecting surfaces 26 are hinged upon or bent along the dotted lines 27 which form a supporting column 28 for the reflecting surfaces. The top pieces 29 containing cutouts 30 are bent along the dotted lines 31. The screw 32 journaled through the cutouts 30 and one of the cutouts 25 is bolted under the hood or radiator.

The diagrammatic sketch of the hood of an automobile in Fig. 7 illustrates the use of a collapsible reflector 33 with two reflecting surfaces 34 hingedly attached to each other along line 35 and also hinged along the other three edges 36 of the reflector. By means of a rod 37 extending from the dashboard to the edge 35 of the reflector and attached thereof, the reflector may be collapsed when desired by pulling on the knob 37'.

Another possible embodiment of the collapsible reflector is shown in the diagrammatic sketch of the hood of a vehicle as shown in Fig. 8 where the reflector 38 is of the vanishing type, attached to a lever 39 which latter is journaled to a fulcrum 40. The lever 39 is manipulated by means of a rod 41 which extends from the dashboard as in Fig. 8 and is operated by pulling on the knob 41' which causes the reflector to vanish.

I do not intend to limit the possible embodiments to any particular design or shape because my invention is for any reflecting surface preferably of chrominum or other highly reflecting medium, such as a mirror or prism, located on the foremost part of a vehicle for obtaining a side view of oncoming traffic in an intersection by merely entering the intersection far enough to bring the reflector within the intersection.

The reflector may be incorporated on an ornament on the hood or radiator being an integral part of the ornament; it being required that the ornament have two reflecting sides in such position that the adjustment of the ornament adjusts the reflector.

It is to be noted that my invention contemplates the use of any type of reflecting surface, such as prisms, mirrors or any other highly polished surface.

The advantages of my invention from the point of safety are illustrated in Figs. 9 and 10 which are diagrammatic views of a typical intersection with cars parked along the curbs up to the corner.

In Fig. 9, the automobile A is not equipped with my sideview reflector and thus its driver could not see the oncoming car B at the left without entering the intersection five or six feet beyond the line of cars parked along the intersection. If B is approaching rapidly, there is a chance for an accident because A must be at least partly obstructing B's path. But in Fig. 10, with car A equipped with a sideview reflector, its driver will be warned of B's approach merely by driving beyond the line of the cars parked along the curb of the intersecting street only far enough for the reflector to operate. In this position B coming up fast could easily avoid car A. The result is that by using my device the driver has the benefit of an extra element of safety when entering into a busy intersection, especially when cars are parked along the curbs up to the corners of the intersecting streets.

Now having described the invention hereof, reference will be had to the claims which follow:

I claim:

1. In combination with a motor vehicle and its hood, a sideview reflector comprising a metal base with cutouts for securing said base to the hood, an upright supporting column being a part of and bent up from said base, reflecting surfaces hingedly bent from the upright column and supported thereby, said reflecting surfaces being a part of and integral with said supporting column, the reflecting surfaces being bent on an angle with respect to the supporting column, extensions of the reflecting surfaces bent to form a top of the reflector, the extensions having disk-like cutouts which will align with each other, a screw to slip within the cutouts of the extensions and of the base for attaching the reflector to the hood and for regulating the adjustment of the angles of the reflecting sides, the screw being bolted beneath the hood.

2. A one piece side view reflector for a motor vehicle comprised of a metal base with cutouts, supporting means bent up from and at right angles thereto, reflecting surfaces bent from and angularly disposed with respect to said supporting means, cover means, with slots, bent at right angles to said reflecting surfaces, a bolt in combination therewith vertically disposed within said cover means and base for fixedly mounting the reflector to said hood and for angularly regulating said reflecting surfaces, said reflector being in one piece formed from a single pattern.

HENRY TURKEL.